United States Patent Office 3,451,996
Patented June 24, 1969

3,451,996
METHOD FOR THE PREPARATION OF HEPARIN
George B. Sumyk and Joseph L. Kyle, Chicago, and Ervin J. Hawrylewicz, Park Forest, Ill., assignors to Thompson Farms Company, Chicago, Ill.
No Drawing. Continuation-in-part of application Ser. No. 385,453, July 27, 1964. This application Feb. 12, 1968, Ser. No. 704,573
Int. Cl. C08b 19/03
U.S. Cl. 260—211    7 Claims

ABSTRACT OF THE DISCLOSURE

The process of preparing heparin comprising autolysis of heparin containing animal tissue while maintaining the digestive pH at an approximately constant pH of 6.5 to 8, adjusting the pH to 10 and removing all of the precipitate, precipitating the poly-saccharides obtained from the original tissue, while maintaining the temperature at 25 to 37° C., removing the poly-saccharide precipitate formed and eluting the precipitate with successively more concentrated eluting solutions to separate the poly-saccharides and precipitating the heparin from each eluate.

---

This application is a continuation-in-part of application Ser. No. 385,453, filed July 27, 1964 and now abandoned.

This invention relates to the preparation of heparin with particular reference to the preparation of purified heparin from animal tissues.

Heretofore heparin has been isolated from lung tissue and liver tissue by various methods, such as that set forth in U.S. Patent No. 2,884,358 to Bush. This process includes the steps of autolysis, alkaline extraction, digestion in the presence of proteolytic enzyme, formation of an hydrophobic heparin complex, floatation of the complex with a water immiscible solvent, separation of the complex from the two liquid phases, separation of the complex by precipitation in alcohol, and removal of the alcohol.

It is an object of the present invention to obtain heparin in a purified form from heparin containing animal tissues by a new process having novel steps therein.

It is a further object of the present invention to provide a process for the preparation of purified heparin from commercially available hog lungs in a relatively simple procedure which is adaptable to plant scale operation.

It is a still further object of this invention to provide a process for the recovery of the excess cetylpyridinium chloride (CPC) from the reaction bath.

The process of this invention comprises:

(1) The autolysis of the heparin containing animal tissue;

(2) Extraction of the animal tissue and precipitation of the acidic poly-saccharides with a heparin precipitating agent, such as cetylpyridinium chloride (CPC) or a quaternary alkyl amine having 6 or more carbon atoms, such as octylamine;

(3) Fractionation of the poly-saccharide-amine complex by selective elutions, using an eluting solution such as sodium chloride or potassium chloride solutions;

(4) Purification of the heparin fraction.

The following four steps in this procedure are essential:

(A) Maintenance of digestive pH during autolysis; the pH can be followed quite easily with a dye indicator or pH indicator paper;

(B) removal of all precipitate which results from adjustment of the pH to 10. This is best accomplished by centrifugation since some of the material is not retained by coarse filters and has a tendency to clog fine filters;

(C) The poly-saccharide-amide complex precipitate must be maintained at temperatures ranging from 20° C.–37° C. In no instance should this precipitation be at a temperature below 20° C.;

(D) Exclusion of all solid material impurities in the salt fractions prior to the heparin purification step.

In general any known autolysis process materials may be used to digest the heparin containing tissue in step A of this process. If one prefers he need not add any additional enzymes to the tissue because the enzymes present will complete the digestion process.

Any known extraction solvent and any known mucopoly-saccharide complexing agent may be used to extract and precipitate the poly-saccharides which include heparin, in step B.

Any known eluting solvent may be used to separate the mucopolysaccharides from each other in step C.

Any known method of purifying the heparin rich eluted fraction may be used in step D. The use of barium or sodium ions in the eluted solution to form the barium or sodium heparin salts are preferred because these products have high purity and are economical to produce. Any soluble barium or sodium salts may be used as the source of the barium or sodium ions.

When the above procedure is followed a crude preparation of heparin with specific anticoagulant activity between 10–15 IU/mg. (International Units per milligram), and a yield of about 6000 units of heparin per kilogram of lung tissue are obtained. This crude preparation is readily purified in the form of barium salt crystals or by other known purification methods. The product has anticoagulant activity comparable to that of the U.S.P. standard for porcine heparin, i.e., 63–67 IU/mg. for the sodium salt which, when recalculated on the basis of 12%–15% water of crystallization, gives an assay of 80–85 IU/mg.

The use of pancreas for enzymatic digestion of the hog lung tissues represents a substantial process saving in time. Commercial proteolytic enzymes are generally utilized in processes in which the cost can be justified by high economic value of the final product. Such is not the case with heparin for which the market is highly competitive. Therefore, utilization of meat by-products is very desirable. If one wished, he could add any known enzyme that will help digest the heparin containing tissue.

The heparin precipitating agents may be recovered and reused. Additional saving can be realized through the recovery of the methyl alcohol or other precipitating agent used in the process to precipitate the various poly-saccharides. Simple distillation equipment would be required for this purpose.

If highly purified heparin (80 IU/mg.) should be desired as the final product, crystallization via barium salt may be repeated a number of times.

The following examples are given by way of illustration only, to show the recovery of the crude heparin from hog lungs, other heparin containing animal tissue may be used and the examples are not intended to limit the scope of this invention:

EXAMPLE 1

1,000 pounds of ground fresh hog lung tissue is mixed with 240 gallons of water. This is heated with slow stirring to 65° C. for 30 minutes, and then allowed to cool to 37° C. To this, 50 pounds of finely ground fresh hog pancreas is added. The pH is adjusted to 7.5 by the addition of 2 N sodium hydroxide. Enough xylene is added to form a layer of about ¼ of an inch on top of the homogenate, and the autolysis is continued with constant stirring for 48 hours maintaining the temperature between 37° C. and 40° C. The pH is checked and adjusted as necessary so that it is maintained at approximately a pH of 7.5.

Approximately 3 gallons of 2 N hydrochloric acid in 4 portions is added slowly with constant stirring to obtain a final more acid pH of between about 5.0 and 5.5, to help precipitate protein impurities. The mixture is heated to 90° C. with stirring and this temperature is maintained for 30 minutes. The protein containing precipitate is removed by centrifugation and cooled to 37° C. Approximately 4 gallons of 2 N sodium hydroxide is added with stirring to obtain a pH of 10, and the precipitate is removed by centrifugation.

Ten gallons of cetylpyridinium chloride (CPC) containing 4 pounds of dry CPC is added slowly with stirring, and the mixture is allowed to stand at 37° C. for at least 2 hours or for 12 hours at room temperature. The precipitate is removed by centrifugation, and washed twice with water. An equal volume of coarse cellite filter aid is added. Approximately 2 to 3 pounds of wet packed precipitate should be obtained. This is prepared in the form of a thick homogeneous slurry by rapid stirring and is poured into a sintered glass column. (The ratio of diameter to length is 1 to 10.) This is allowed to pack well by percolating 0.03 M saline solution for about one hour.

The various poly-saccharides are successively eluted with 0.3 to 0.5 M, 1 to 14 M and 1.9 to 2.3 M sodium chloride solution using about three times the volume of the packed polysaccharide-CPC precipitate for each elution. Methods of eluting the various poly-saccharides are known.

Three volumes of methyl alcohol are added to each eluate. The precipitate is allowed to form overnight, and is removed by centrifugation, washed twice with a small amount of absolute alcohol and twice with ether, and dried over calcium chloride. Each precipitate is weighed and assayed for anticoagulant activity.

Finally, the crude heparin is redissolved and crystallized in the form of its barium salt.

Further details for the preparation of heparin from hog lung tissue are given below; but the basic four steps given above are essential.

EXAMPLE 2

Autolysis of lung tissue

Fresh hog lungs are homogenized with the addition of 2 liters of water for each kilogram of tissue. The homogenate is then heated to 75° C. for 30 minutes in order to partially denature the tissue and render it more susceptible to digestion by proteolytic enzymes. After cooling the pH is adjusted according to the requirements of the enzyme system used. When commercial pancreatin or ground, fresh pancreas is used, a pH of 7.5–8.0 is found to be optimal for digestion. The autolysis in this case is carried out for 48 hours at 37° C.–40° C. When papain along with cysteine hydrochloride and ethylenediamine-tetraacetic acid is used digestion is performed at a pH of 6.5, which is the approximate pH of the tissue homogenate. The autolysis is then allowed to proceed for 24 hours at 65° C.–75° C. All digestions are done with slow stirring, and to prevent bacterial decomposition, a layer of xylene is maintained over the homogenate.

At the end of the autolysis the homogenates are adjusted to a pH of 5.0 with hydrochloric acid and the undigested proteins coagulated by heating to 85° C. for 30 minutes. The bulk of precipitated material is removed by ether filtration on coarse filters or by centrifugation. The supernatant is adjusted to a pH of 10.0 with sodium hydroxide, and additional precipitate is completely removed by centrifugation.

Precipitation of poly-saccharides with CPC

To the clear supernatant obtained by digesting 1 kilogram of wet hog lung, 4 grams of CPC in 5% aqueous solution is added slowly with stirring. The white precipitate formed on standing for 1 hour at 37° C. is removed by centrifugation. The supernatant is then cooled to 4° C. and the unprecipitated excess of CPC is recovered in the cold by filtration through a fine pore filter. It is then washed with a small amount of 0.1 M NaCl and dried under desiccation.

Fraction of poly-saccharide-CPC complex

The wet, packed poly-saccharide-CPC precipitate is washed thoroughly with water and mixed with a small amount of coarse filter aid. The fractional elution is carried out in the sintered glass funnel of a size permitting a slow precolation rate. Successive washes with 80 ml. each of 0.4 M, 1.2 M and 2.1 M NaCl are employed for solubilization. The three major poly-saccharides contained in the eluates are: hyaluronic acid, chondroitin sulfate and heparin, all of which possess a hexuronic acid moiety. The hexuronic acid content is monitored throughout the elution by the carbazole method.

The desalting of the poly-saccharide eluates may be performed initially, on Sephadex columns. Since heparin is a relatively large molecule, it is excluded from dextran gel on passage through a packed column. Sephadex G–25 proved to be satisfactory for the desalting purpose.

Preferably, the free poly-saccharides are precipitated from saline solutions by addition of three volumes of methyl alcohol. The slowly forming precipitates are removed by centrifugation. They are washed first with absolute ethyl alcohol followed by ether washing and dried over calcium chloride. The dried fractions are assayed for anticoagulant activity.

Crystallization of heparin with barium

The crude poly-saccharide preparations having anticoagulant activity are treated with soluble barium salts to crystallize heparin in the form of its barium salt. Barium crystallization requires prior knowledge of the specific anticoagulant activity, expressed as international units per milligram (IU/mg.) of crude material. The amount of heparin in a given sample can be calculated by multiplying the total number of heparin units by a factor $\frac{1}{63}$, taking into account the water of crystallization.

Once the theoretical quantity of pure heparin in a given amount of crude material is known the crystallization can be carried out with assurance of obtaining a reasonably potent preparation and a good yield. The most critical aspect of this procedure of forming high purity heparin crystals is the maintenance in the final solution of a concentration of 10–60 mg./ml. of pure heparin. The following steps are involved in a typical illustrative crystallization procedure:

(1) A quantity of crude material calculated to contain 1 gram of pure heparin is dissolved in 5 ml. of alkaline water (approximately 0.02 M NaOH).

(2) To this solution 1.5 ml. of 20% ammonium carbonate is added and the mixture heated at 65° C. for 10 to 20 minutes. The mixture is centrifuged and the supernatant decanted.

(3) The centrifugal pellet is washed at 65° C. for 5 to 10 minutes with 1.0–2.0 ml. of 4.6% ammonium carbonate and centrifuged.

(4) The supernatant from step 3 is added to the one from step 2 and the mixture acidified with glacial acetic acid to pH 4–5.

(5) The volume is made up to 12.5 ml. with water.

(6) 17.5 ml. of 10% barium acetate is then added and the supernatants heated to 65° C. The solution is centrifuged at 1800×g. at room temperature and the clear supernatant decanted.

(7) The supernatant is warmed to 65° C. and 15.0 ml. of glacial acetic acid added. The solution is removed from the heat and allowed to cool slowly, preferably overnight, at room temperature. The crystals formed are those of heparin barium salt.

(8) To convert the product to the neutral sodium salt, crystals are dissolved in alkaline water, barium is removed from solution by adding excess ammonium carbonate, and the carbonate by adding excess glacial acetic acid. The pH is then adjusted carefully with sodium hydroxide solution to 7.0–7.1.

(9) Purified heparin is precipitated by pouring this solution into three volumes of methanol. The precipitate is washed twice with absolute ethanol and twice with anhydrous ether, and finally dried at 25° C. over calcium chloride.

TABLE 1.—HEXURONIC ACID CONTENT OF THE POLYSACCHARIDES EXTRACTED FROM HOG LUNG AUTOLYSATES

| Enzyme system | Autolysis | | Extract vol., ml. | $E_{530}$/ml. extract (Carbazole assay) | $E_{530}$/ml.× ml. of extract |
|---|---|---|---|---|---|
| | Time, hr. | Temp., °C. | | | |
| 1% pancreas | 24 | 38 | 80 | 0.620 | 49.6 |
| Do | 48 | 38 | 150 | 1.66 | 249.0 |
| Do | 96 | 38 | 179 | 1.17 | 209.4 |
| Do | 48 | 38 | | | |
| and 0.025% Papain | 48 | 60 | 181 | 1.03 | 186.4 |

In one experiment the relationship between digestion time and yield of poly-saccharide using pancreas and papain for autolysis of lung tissue was determined. Aliquots of fresh hog lungs (0.5 kg.) was used and 5 grams by weight of ground pancreas was added to each portion. One of the portions was digested with 200 mg. of crude papain preparation following the autolysis with pancreas. Table 1 shows the yields of hexuronic acid obtained by precipitation of poly-saccharides with CPC and solubilization with 2.1 M NaCl solution.

In another experiment the 24 and 48 hour autolysis with 1% pancreas was compared to the 24 hour digestion with 1% papain. The data is shown in Table 2 and it confirms the results found in Table 1.

The yields of anticoagulant activity in the 1.2 M and 2.1 M NaCl eluates of poly-saccharide-CPC, Fisher's pancreatin and papain digested hog lungs were also compared. In this case higher concentrations of enzymes were employed. The papain digestions were carried out at pH 6.5 for 24 hours and the other at pH of 7.5 for 48 hours. The yields shown in Table 3 are based on 500 grams of wet lung weight following precipitation with CPC, elution with approximately 0.4 M, 1.2 M and 2.1 M NaCl and precipitation of poly-saccharides with methyl alcohol.

TABLE 2.—HEXURONIC ACID CONTENT OF THE POLYSACCHARIDES EXTRACTED FROM HOG LUNG AUTOLYSATES

| Enzyme system | Time, hr. | Temp., °C. | Extract vol., ml. | $E_{530}$/ml. extract (Carbazole assay) | $E_{530}$/ml.× ml. of extract |
|---|---|---|---|---|---|
| 1% pancreas | 24 | 37 | 97 | 0.62 | 87.6 |
| Do | 48 | 37 | 68 | 1.95 | 180.9 |
| 0.1% Papain | 24 | 70 | 116 | 0.93 | 172.8 |

TABLE 3.—RECOVERY OF ANTICOAGULANT ACTIVITY IN THE POLY-SACCHARIDE EXTRACTS FROM HOG LUNG TISSUE TREATED WITH DIFFERENT PROTEOLYTIC ENZYMES

| Enzyme system | Eluent (NaCl concentration in moles/liter) | Dry weight (mg.) | Specific activity (IU/mg.) | Total activity (international units) |
|---|---|---|---|---|
| 0.1% Fisher's pancreatin | 1.2 | 185.9 | 5.15 | 930 |
| | 2.1 | 174.0 | 11.2 | 1,950 |
| 5% pancreas | 1.2 | 512.9 | 2.2 | 1,125 |
| | 2.1 | 194.8 | 12.4 | 2,415 |
| 1% papain | 1.2 | 271.4 | 2.19 | 594 |
| | 2.1 | 121.8 | 12.4 | 1,510 |
| 0.1% papain | 1.2 | 471.8 | 1.43 | 675 |
| | 1.5 | 338.8 | 3.35 | 1,135 |
| | 2.1 | 66.9 | 1.00 | 67 |
| 5% pancreas | 1.2 | 281.3 | 4.25 | 1,196 |
| Followed by 1% papain | 2.1 | 106.0 | 8.00 | 848 |

The effect of enzyme concentration on yield of polysaccharides from lung tissue was determined. Under identical conditions the yield of carbazole positive material and anti-coagulant activity in the 2.1 M NaCl soluble CPC-poly-saccharide complex was three times greater than for 1% pancreas hydrolysate. Since the total yield of anticoagulant activity was relatively low even with 5% pancreas digests the heat coagulation of lung tissue prior to digestion was considered. Initial experiments gave unusually low yields of anticoagulant activity from heat coagulated and untreated samples. They were, however, still significantly higher than the yields from the heat denatured tissue. Subsequent experiments proved the value of heat coagulation. As can be seen from Table 3 the recovery of anticoagulant activity from the 5% pancreas digestion of heat denatured lungs compares favorably with the yield obtained with 0.1% pancreatin and 1% papain digestion.

In three separate experiments the anticoagulation activity was measured. The yields were found to be reproducible with 5% crude pancreas. The purity of the crude heparin of these preparations varied between 8.0 and 12.4 IU/mg. While the maximum purity of the crude heparin obtained with papain closely parallels that obtained with pancreas, the extraction procedure was far less dependable. As indicated by the experimental data, the yields of total activity with papain were considerably lower.

Precipitation of polysaccharides with CPC

During investigation of the application of polysaccharide precipitation with CPC the following parameters were considered: (1) optimal pH, (2) temperature (3) concentration of CPC and (4) ionic strength of the autolysate.

Precipitation proceeds satisfactorily at pH of 10.0. At pH below 9 the rate of precipitation and the yield are greatly diminished, while at pH above 11 decomposition of the quarternary amine is rapid resulting in very low yields of the polysaccharide complex.

The optimal temperature for the formation of CPC polysaccharide complex is about 37° C. and preferably should not be below 25° C. Since CPC is not soluble in aqueous solutions at low temperature the precipitation should not be carried out in the cold. Cooling the solution to 4° C. causes CPC to crystallize out in fine needles which can be removed by filtration. Thus, this property offers a convenient way for recovering the excess of CPC for supernatants.

The concentration of CPC is critical for precipitation

Four grams of CPC in a 5% aqueous solution is adequate to precipitate polysaccharides from 1 kilogram of wet hog lungs. This amount may be reduced to about 3 g./kg. of tissue without significantly lowering the yield of the precipitate.

The ionic strength of the lung tissue extract appears to be of no great importance to the precipitation step.

Experiments carried out with chemical heparin preparations indicate that whereas the bulk of this polysaccharide is eluted from the CPC complex with 2.1 M NaCl a substantial amount is also found in the 1.2 M NaCl eluates. Hence it is not surprising that the precipitation at 1.4 M NaCl results in low yields of heparin from hog lung extracts.

The increase of ionic strength of the lung autolysis due to the addition of hydrochloric acid and sodium hydroxide for the purpose of pH adjustment does not affect the complex formation. Table 4 shows a typical elution schedule for the quantity of polysaccharide CPC precipitate obtained from 500 grams of wet lung tissue.

TABLE 4.—RECOVERY OF POLYSACCHARIDE FROM CPC COMPLEX AS DETERMINED BY THE HEXURONIC ACID ASSAY

| Solvent | Fraction No. | Vol., ml. | $E_{530}$/ml. (Carbazole assay) |
|---|---|---|---|
| Supernatant | 1 | 1,000 | [1] 1.10 |
| 0.03 M NaCl | 2 | 29 | [1] 0.081 |
| 0.4 M NaCl | 3 | 24 | 0.304 |
|  | 4 | 32 | 0.245 |
|  | 5 | 32 | 0.140 |
|  | 6 | 31 | 0.098 |
| 1.2 M NaCl | 7 | 30 | 4.70 |
|  | 8 | 33 | 5.94 |
|  | 9 | 32 | 3.35 |
|  | 10 | 30 | 3.35 |
| 2.1 M NaCl | 11 | 31 | 5.80 |
|  | 12 | 32 | 4.15 |
|  | 13 | 31 | 1.30 |
|  | 14 | 34 | 0.63 |

[1] Brown.

As can be seen the bulk of the material is eluted with 1.2 M and 2.1 M NaCl. When the eluates were pooled and the polysaccharides precipitated with twice the volume of methyl alcohol, dried, and weighed, the yied was: 4 mg. for 0.4 M NaCl; 176 mg. for 1.2 M NaCl; and 125 mg. for 2.1 M NaCl.

Solubilization in large volume of saline and centrifugation to remove undissolved precipitate was also studied. This method requires larger volumes of saline to insure a clean separation. The removal of undissolved precipitate is difficult following the extraction of 1.2 M NaCl. On the other hand solubilization by percolation is more time consuming since the flow rate of the saline solution must be slow to allow sufficient time for equilibration. To afford greatest possible surface area to the eluent the precipitate should be ground with coarse filter aid before packing the funnel.

Crystallization of heparin with barium

In a typical barium crystallization step with 2.1 M NaCl fraction, 235.4 mg. of the fraction assayed at 10 IU/mg. was dissolved in 0.5 ml. of alkaline water at pH of 10. To remove barium, 0.15 ml. of 20% ammonium carbonate solution was added and the mixture heated at 65° C. for 10 minutes. The supernatant is recovered following centrifugation, and 0.2 ml. of 4.6% ammonium carbonate was added to the precipitate, stirred and heated at 65° C. This mixture was also centrifuged and the supernatant was added to the original supernatant. The combined supernatants were acidified to pH 4.5 with one drop of glacial acetic acid. To the solution 0.5 ml. of 10% barium acetate was added and it was heated at 65° C. for 10 minutes. The solution was then centrifuged and the supernatant was taken and heated at 65° C. To the warm solution 0.44 ml. of glacial acetic acid was added and allowed to cool slowly to room temperature. The resulting crystals are those of heparin barium salt which was removed by centrifugation and converted to the sodium salts as described above. The sodium salt of heparin was precipitated out with three volumes of methyl alcohol, washed twice with absolute ethyl alcohol, twice with ether and dried over calcium chloride. The total weight of the dried material was 14.9 mg.

On the basis of the original assay of the material approximately 30 mg. of pure heparin should be present in the mixture. The anticoagulant assay of this material showed it to contain 66.5 IU/mg. or a total of 991 units, compared to the original assay of 2354 units. The recovery was therefore 42% of the active material.

Further experiments have been carried out to define the problems involved in the barium crystallization step. Barium crystallization was carried out with 95.5 mg. of commercial heparin (120 units/mg.) simultaneously with one using the 2.1 M NaCl preparations from hog lung (117.3 mg.-assay 8.7 units/mg.). The experiments were carried through the recrystallization step. The crystals were removed from the mother liquor by centrifugation after 3 hours of standing, and converted to the sodium salts. The mother liquors were placed in clean 12 ml. centrifuge tubes, covered, and allowed to stand for two days at room temperature. On reexamination it was noted that the solutions contained considerably more precipitate. This material was also removed by centrifugation and processed as the original material. The assays of the material and their dry weights are shown in Table 5.

As can be seen from Table 5 the bulk of anticoagulant activity from the crude polysaccharide preparation was found in the second crop crystals although the specific gravity did not differ from that of the first crystal crop. It is important therefore to allow sufficient time for the crystallization. For maximum yields it is necessary to crystallize for an additional 24 hours at about 4° C. after the initial 24 hour crystallization at room temperature.

TABLE 5.—HEPARIN CRYSTALLIZATION WITH BARIUM

| Material | Fraction | Dry weight, mg. | Anticoagulant activity, units/mg. | Total activity, units | Percent recovery |
|---|---|---|---|---|---|
| Commercial heparin. | First crop crystals | 38.7 | 129 | 4,992.3 | 43.6 |
|  | Second crop crystals. | 43.4 | 129 | 5,598.6 | 48.9 |
| Hog Lung Preparation. | First crop crystals | 5.3 | 30.1 | 159.5 | 15.6 |
|  | Second crop crystals. | 25.1 | 30.0 | 753.0 | 78.3 |

The heparin-barium crystals preparations were examined microscopically and found to be the typical rosettes arrangement described in the literature.

The method of the present invention allows the commercial preparation and purification of heparin from hog lungs by a relatively simple procedure that can be adopted to plant scale production.

Another advantage of this method is the ease of recovery of the most costly reagent, cetylpyridinium chloride. A further advantage of this process is that the pH control during autolysis can be quite easily followed by a dye indicator or with a pH indicator paper.

A yield of crude heparin with a specific anticoagulent activity of between 10–15 IU/mg. and a total yield of about 6000 units of heparin per kilogram of lung tissue is obtained. This crude preparation readily yields to purification through barium crystallization. It results in a product that has anti-coagulant activities comparable to that of U.S.P. standards for porcine heparin. The barium crystallization step produces a final product in good yield having high potency.

These and other advantages will be apparent to one skilled in the art from the above examples which are given for the purposes of illustration only and should not be considered as a limitation on the process.

What is claimed is:

1. A process for the preparation of heparin which comprises:
   (a) autolysis of heparin containing animal tissue while maintaining a digestive pH;
   (b) precipitating and removing the protein impurities;
   (c) precipitating the poly-saccharides while maintaining the temperature within the range of 20–37° C., removing the precipitated poly-saccharides, and (d) separating the individual poly-saccharides with eluting solutions to obtain solutions free of all solid impurities.

(e) separating heparin from said poly-saccharide solutions.

2. The process of claim 1, wherein said poly-saccharide precipitation of step (c) is achieved by adding a precipitating agent selected from the group consisting of cetylpyridinium chloride and quaternary alkyl amines having 6 or more carbon atoms.

3. The process of claim 1 which comprises:

(a) autolysis of heparin containing animal tissue while maintaining the digestive pH at an approximate constant pH of 6.5 to 8, adjusting the pH to approximately 5 to 5.5, removing the solid protein precipitate, adjusting the pH to about 10 and removing of solid protein precipitate, (b) the precipitation of the poly-saccharide obtained from said tissue by the addition of approximately 3 to 4 grams of cetylpyridinium chloride per kilogram of original tissue, maintaining the pH within the range of 9 to 11 and the temperature within the range of 25° C. to 37° C., removing the solid polysaccharide complex, after standing from 2 to 12 hours, packing the precipitate into a sintered glass column, (c) eluting the poly-saccharide successively with approximately 0.3 to 0.5 M, 1.0 to 1.4 M and 1.9 to 2.3 M sodium chloride solution, using approximately three times the volume of the packed poly-saccharide precipitate for each elution, and (d) precipitating the heparin from each eluate by the addition of three times its volume of alcohol.

4. The process of claim 1, wherein the heparin is purified by adding barium ions to the heparin containing eluted solutions to form barium heparin salt crystals.

5. The process of claim 3, wherein the filtrate after the removal of the solid poly-saccharide complex is cooled to approximately 4° C. to precipitate the excess cetylpyridinium chloride and the recovery of the same.

6. The process of claim 1 which comprises:

(a) the autolysis of heparin containing animal tissue while maintaining the digestive pH at an approximate constant pH of 6.5 to 8, adjusting the pH to 10 and the removal of solid protein, (b) the precipitation of the poly-saccharide obtained from said tissue by the addition of approximately 3 to 4 grams of cetylpyridinium chloride per kilogram of original tissue, maintaining the pH within the range of about 9 to 11 and the temperature within the range of about 25° C. to 37° C., removing the solid poly-saccharide complex, after standing from about 2 to 12 hours, packing the precipitate into a sintered glass column, (c) eluting the poly-saccharide with sodium chloride solutions to successively separate the poly-saccharides using approximately three times the volume of the packed poly-saccharide precipitate for each elution, and (d) precipitating the heparin from each eluate by the addition of three times its volume of alcohol.

7. The process of claim 1, wherein said tissue is hog lung tissue.

References Cited

UNITED STATES PATENTS

| | | | |
|---|---|---|---|
| 2,884,358 | 4/1959 | Bush et al. | 260—211 |
| 3,342,683 | 9/1967 | Hashimoto et al. | 260—211 |

LEWIS GOTTS, *Primary Examiner.*

J. R. BROWN, *Assistant Examiner.*